(12) United States Patent
Meintanis et al.

(10) Patent No.: US 9,542,064 B2
(45) Date of Patent: Jan. 10, 2017

(54) INFORMATION PINNING FOR CONTEXUAL AND TASK STATUS AWARENESS (71) Applicant: Schlumberger Technology Corporation, Sugar Land, TX (US)

(72) Inventors: Konstantinos Meintanis, Houston, TX (US); Rene Radhay, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 648 days.

(21) Appl. No.: 13/905,649

(22) Filed: May 30, 2013

(65) Prior Publication Data

US 2013/0326363 A1 Dec. 5, 2013

Related U.S. Application Data

(60) Provisional application No. 61/655,227, filed on Jun. 4, 2012.

(51) Int. Cl.
*G06F 3/0481* (2013.01)
*H04L 29/06* (2006.01)
(Continued)

(52) U.S. Cl.
CPC ........... *G06F 3/0481* (2013.01); *G06F 9/4443* (2013.01); *G06F 17/241* (2013.01);
(Continued)

(58) Field of Classification Search
CPC ........ G01V 1/34; G01V 2210/66; G01V 1/00; G01V 1/30; G01V 1/345; G01V 1/50; G06F 17/241; G06F 3/0484; G06F 9/4443; G06F 17/30241; G06F 3/048; G06F 3/0481; G06F 8/20; G06F 2209/482; E21B 47/00; H04L 12/1813; H04L 12/1822; H04L 65/403; H04N 7/15; G06Q 10/101
See application file for complete search history.

(56) References Cited

U.S. PATENT DOCUMENTS 5,412,776 A * 5/1995 Bloomfield ........... G06F 3/0481
715/783
5,559,942 A * 9/1996 Gough .................. G06F 3/0481
707/E17.013
(Continued)

OTHER PUBLICATIONS

Broussard, F. et al., "G&G software accelerates user productivity", Schlumberger Ltd., Hart Energy, Houston, Texas Aug. 2011 (2 pages).
(Continued)

*Primary Examiner* — Nicholas Ulrich
(74) *Attorney, Agent, or Firm* — Colin L. Wier; Gary Gex; Alec McGinn (57) ABSTRACT

A method, system, and non-transitory computer readable storage medium for accessing historic information during exploration and production (E&P) tool sessions of a field. Accessing historic information includes identifying an E&P tool configured to perform a plurality of E&P tool sessions based on a subterranean formation field data set, receiving an annotation input from a user while the user is performing a task using one of a plurality of windows that are created during at least a first one of the plurality of E&P tool sessions, wherein the task is performed based on the subterranean formation field data set, and generating, by a computer processor and in response to the annotation input, a pinned annotation that is pinned to the one of the plurality of windows, wherein the task performed based on the subterranean formation field data set is facilitated using the pinned annotation.

20 Claims, 6 Drawing Sheets

(51) Int. Cl.
*G06Q 10/10* (2012.01)
*G06F 17/24* (2006.01)
*G06F 9/44* (2006.01)
*G06F 17/30* (2006.01)
*G01V 1/00* (2006.01)
*G01V 99/00* (2009.01)

(52) U.S. Cl.
CPC ..... *G06F 17/30572* (2013.01); *G06Q 10/101* (2013.01); *H04L 65/403* (2013.01); *G01V 1/00* (2013.01); *G01V 99/00* (2013.01)

(56) References Cited

U.S. PATENT DOCUMENTS

| | | | | | |
|---|---|---|---|---|---|
| 5,596,700 | A * | 1/1997 | Darnell | ................ | G06F 3/0481 715/205 |
| 5,668,962 | A * | 9/1997 | Kitami | ................ | G06F 3/0481 715/783 |
| 5,821,931 | A * | 10/1998 | Berquist | ............. | G06F 3/0481 715/784 |
| 6,195,092 | B1 * | 2/2001 | Dhond | ................ | G06Q 10/10 702/6 |
| 6,262,728 | B1 * | 7/2001 | Alexander | ......... | G01R 13/0245 345/440.1 |
| 6,529,215 | B2 * | 3/2003 | Golovchinsky | ..... | G06F 3/04883 715/231 |
| 7,103,848 | B2 * | 9/2006 | Barsness | .......... | G06F 17/30716 715/776 |
| 7,356,563 | B1 * | 4/2008 | Leichtling | ............. | G06Q 10/06 345/2.1 |
| 7,966,569 | B2 * | 6/2011 | Pandey | ................... | E21B 41/00 702/9 |
| 8,015,501 | B2 * | 9/2011 | Conrad | ................ | G06F 3/0481 715/783 |
| 8,413,039 | B2 * | 4/2013 | Casey | ................... | G06F 17/243 340/3.2 |
| 2007/0083458 | A1 * | 4/2007 | Rosenthal | ............. | G06Q 10/10 705/37 |
| 2008/0022195 | A1 * | 1/2008 | Lyle | ....................... | G06Q 10/10 715/230 |
| 2008/0065995 | A1 * | 3/2008 | Bell | ....................... | G06F 17/218 715/751 |
| 2009/0194274 | A1 * | 8/2009 | Del Castillo | .......... | E21B 43/00 166/250.01 |
| 2009/0225630 | A1 | 9/2009 | Zheng et al. | | |
| 2009/0229819 | A1 * | 9/2009 | Repin | ..................... | E21B 47/00 166/250.01 |
| 2010/0077291 | A1 * | 3/2010 | Takahashi | ............. | G06Q 10/10 715/230 |

OTHER PUBLICATIONS

"Method for Creating Annotation Data", IBM Technical Disclosure Bulletin, International Business Machines Corp., vol. 28(4), Sep. 1985, pp. 1623-1628.
Extended European Search Report issued in EP13170386.0 on Feb. 19, 2014, 8 pages.
Studio 2012 E&P Knowledge Environment, "Enhanced productivity and knowledge management for Petrel software", Schlumberger, 2011 (2 pages).

* cited by examiner

INFORMATION PINNING FOR CONTEXTUAL AND TASK STATUS AWARENESS

CROSS REFERENCE TO RELATED APPLICATIONS

This application claims benefit under 35 U.S.C. §119(e) of U.S. Provisional Patent Application No. 61/655,227, filed on Jun. 4, 2012, and entitled "INFORMATION PINNING FOR CONTEXTUAL & TASK STATUS AWARENESS," which is hereby incorporated by reference.

BACKGROUND

Operations, such as geophysical surveying, drilling, logging, well completion, and production, may be performed to locate and gather valuable downhole fluids. Surveys are often performed using acquisition methodologies, such as seismic mapping, resistivity mapping, etc. to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found as well as the activities to extract them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

Models of subsurface hydrocarbon reservoirs and oil wells are often used in simulation (e.g., in modeling oil well behavior) to increase yields and to accelerate and/or enhance production from oil wells. Seismic interpretation tools and seismic-to-simulation programs, such as PETREL® (a registered trademark of Schlumberger Technology Corporation, Houston, Tex.), can include numerous functionalities and apply complex techniques across many aspects of modeling and simulating. Such programs can include a large suite of tools and different programs. Users of such systems may spend many hours per day working with these tools in an effort to optimize geological interpretations and reservoir engineering development scenarios.

One of the major challenges users face when multitasking in highly complex environments is to contextually switch from task to task in an efficient way. The time and effort expended remembering where a job was left off what was the status of a process sometime ago can have a major impact on the speed and the quality a task is performed. The same phenomenon of contextual disorientation can be found in highly collaborative environments when multiple people contribute to the same project keeping a loose communication among them. Understanding what has changed, when, why and by whom can be considerably cumbersome and confusing, especially when there is no easy way to point out the updates.

SUMMARY

In general, in one aspect, an embodiment of the invention relates to a method for accessing historic information during an exploration and production (E&P) tool sessions of a field having a subterranean formation. The method includes identifying an E&P tool that performs a plurality of E&P tool sessions based on a subterranean formation field data set and receiving an annotation input from a first user while the first user is performing a task using one of a plurality of windows that are created during at least a first one of the plurality of E&P tool sessions. The task is performed based on the subterranean formation field data set. The method also includes generating, by a computer processor and in response to the annotation input, a pinned annotation that is pinned to the one of the plurality of windows, where the task performed based on the subterranean formation field data set is facilitated using the pinned annotation.

Other aspects of the invention will be apparent from the following description and the appended claims.

BRIEF DESCRIPTION OF DRAWINGS

The appended drawings illustrate several embodiments of information pinning for contextual & task status awareness and are not to be considered limiting of its scope, for information pinning for contextual & task status awareness may admit to other equally effective embodiments.

FIG. 1.1 is a schematic view, partially in cross-section, of a field in which one or more embodiments of information pinning for contextual & task status awareness may be implemented.

FIG. 1.2 shows an exploration and production modeling tool in accordance with one or more embodiments.

FIGS. 3.1 and 3.2 depict an example for information pinning for contextual & task status awareness in accordance with one or more embodiments.

DETAILED DESCRIPTION

Aspects of the present disclosure are shown in the above-identified drawings and described below. In the description, like or identical reference numerals are used to identify common or similar elements. The drawings may not be to scale and certain features may be shown exaggerated in scale or in schematic in the interest of clarity and conciseness.

Aspects of the present disclosure include a method, system, and computer readable medium to provide an easy and intuitive way of keeping information easily accessible on a window-based software application. In one or more embodiments, users can "pin" textual and graphical pieces of data to their application window and modify other content within the window, switch to other windows (of the same or a different application), or even close the application without losing the pinned information when they return.

In one or more embodiments, a virtual tag is assigned to a location and/or data object—and allows for the addition of text, link, image, document, etc. to explain information about or concerning the item or location in question. It also allows for the selection of an annotation "type" by the selection of a graphical icon that gives the other users an understanding of the nature of the annotation, example: basic informative, notification, alert, etc. Further, history of an object in terms of data associated with the object and changes made to the object are stored together with their timestamps. Accordingly, users can search across their organization for data relevant to their interpretation space.

Embodiments support status awareness when the job at hand includes switching among windows, applications, users, and work sessions. Using the analogy of pinning a paper note on the wall, user can "pin" particular information (e.g., what's the status of their work, things that need to be addressed by their colleagues, changes that have been made, points of attention) to their application window. From the point of view when such pinned information is later accessed again, the pinned information may be referred to as historic information. The pinned annotations may stay open and be directly visible in the window they are pinned if the user works at the same time on other tasks, windows or applications. They also come up when the user opens the application and returns to the window the annotations were pinned Annotations can easily get unpinned allowing effortless cleaning of the interface from information that is not pertinent or applicable anymore.

Figure 11:
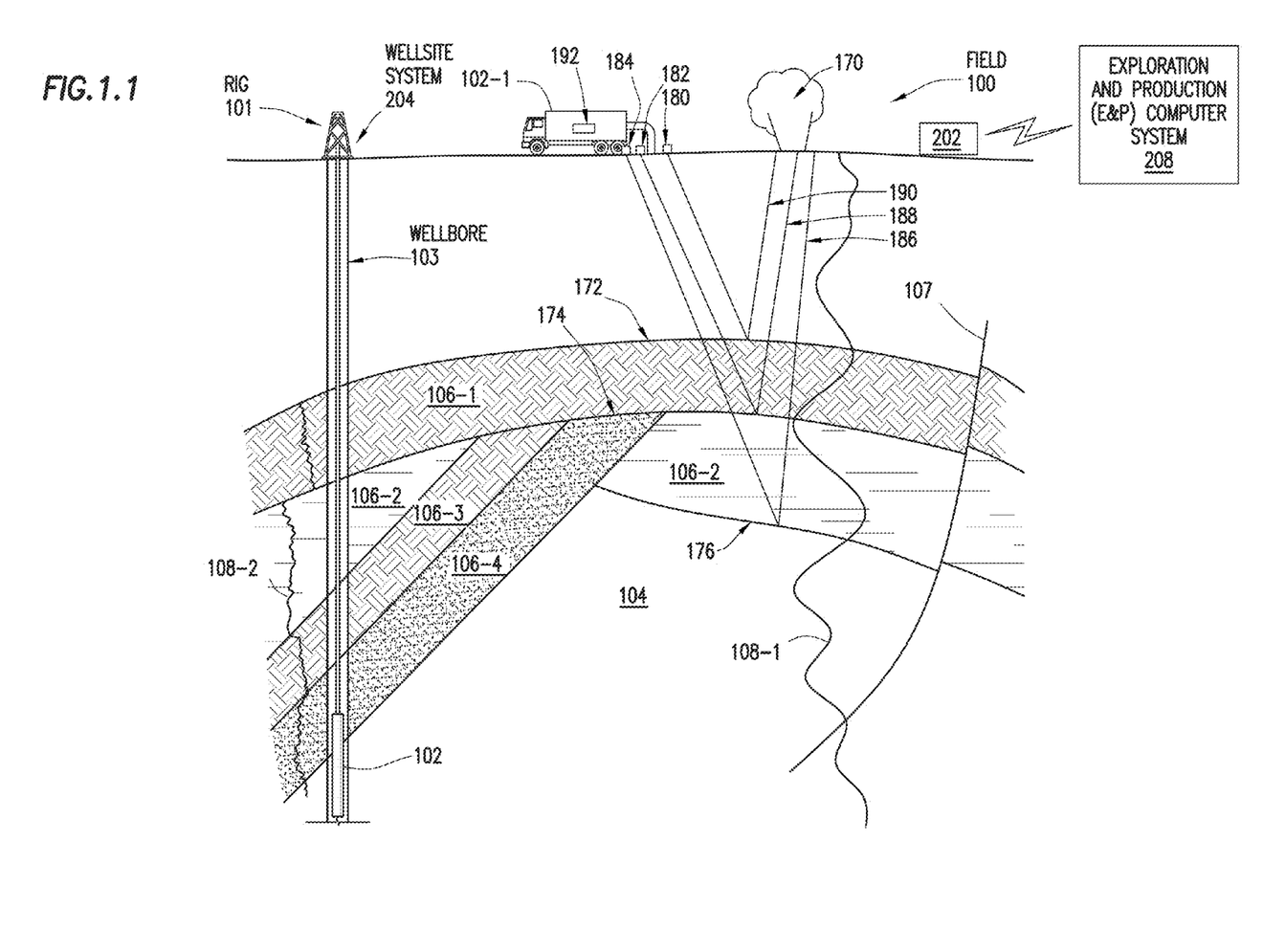

FIG. 1.1 depicts a schematic view, partially in cross section, of a field (100) in which one or more embodiments of information pinning for contextual & task status awareness may be implemented. In one or more embodiments, one or more of the modules and elements shown in FIG. 1.1 may be omitted, repeated, and/or substituted. Accordingly, embodiments of information pinning for contextual & task status awareness should not be considered limited to the specific arrangements of modules shown in FIG. 1.1.

As shown in FIG. 1.1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, various survey tools and/or data acquisition tools are adapted to measure the formation and detect the characteristics of the geological structures of the formation. As noted above, the outputs of these various survey tools and/or data acquisition tools, as well as data derived from analyzing the outputs, are considered as part of the historic information.

As shown in FIG. 1.1, seismic truck (102-1) represents a survey tool that is adapted to measure properties of the subterranean formation in a seismic survey operation based on sound vibrations. One such sound vibration (e.g., 186, 188, 190) generated by a source (170) reflects off a plurality of horizons (e.g., 172, 174, 176) in the subterranean formation (104). Each of the sound vibrations (e.g., 186, 188, 190) are received by one or more sensors (e.g., 180, 182, 184), such as geophone-receivers, situated on the earth's surface. The geophones produce electrical output signals, which may be transmitted, for example, as input data to a computer (192) on the seismic truck (102-1). Responsive to the input data, the computer (192) may generate a seismic data output, which may be logged and provided to a surface unit (202) by the computer (192) for further analysis. The computer (192) may be a computer system as shown and described in relation to FIG. 4.

Further as shown in FIG. 1.1, the wellsite system (204) is associated with a rig (101), a wellbore (103), and other wellsite equipment and is configured to perform wellbore operations, such as logging, drilling, fracturing, production, or other applicable operations. Generally, survey operations and wellbore operations are referred to as field operations of the field (100). These field operations may be performed as directed by the surface unit (202).

In one or more embodiments, the surface unit (202) is operatively coupled to the computer (192) and/or a wellsite system (204). In particular, the surface unit (202) is configured to communicate with the computer (192) and/or the data acquisition tool (102) to send commands to the computer (192) and/or the data acquisition tools (102) and to receive data therefrom. For example, the data acquisition tool (102) may be adapted for measuring downhole properties using logging-while-drilling ("LWD") tools. In one or more embodiments, surface unit (202) may be located at the wellsite system (204) and/or remote locations. The surface unit (202) may be provided with computer facilities for receiving, storing, processing, and/or analyzing data from the computer (192), the data acquisition tool (102), or other part of the field (104). The surface unit (202) may also be provided with or functionally for actuating mechanisms at the field (100). The surface unit (202) may then send command signals to the field (100) in response to data received, for example to control and/or optimize various field operations described above.

In one or more embodiments, the data received by the surface unit (202) represents characteristics of the subterranean formation (104) and may include seismic data and/or information related to porosity, saturation, permeability, natural fractures, stress magnitude and orientations, elastic properties, etc. during a drilling, fracturing, logging, or production operation of the wellbore (103) at the wellsite system (204). For example, data plot (108-1) may be a seismic two-way response time or other types of seismic measurement data. In another example, data plot (108-2) may be a wireline log, which is a measurement of a formation property as a function of depth taken by an electrically powered instrument to infer properties and make decisions about drilling and production operations. The record of the measurements, which may be printed on a long strip of paper, may also be referred to as a log. Measurements obtained by a wireline log may include resistivity measurements obtained by a resistivity measuring tool. In yet another example, the data plot (108-2) may be a plot of a dynamic property, such as the fluid flow rate over time during production operations. Those skilled in the art will appreciate that other data may also be collected, such as, but not limited to, historical data, user inputs, economic information, other measurement data, and other parameters of interest.

In one or more embodiments, the surface unit (202) is communicatively coupled to an exploration and production (E&P) computer system (208). In one or more embodiments, the data received by the surface unit (202) may be sent to the E&P computer system (208) for further analysis. Generally, the E&P computer system (208) is configured to analyze, model, control, optimize, or perform other management tasks of the aforementioned field operations based on the data provided from the surface unit (202). In one or more embodiments, the E&P computer system (208) is provided with functionality for manipulating and analyzing the data, such as performing seismic interpretation or borehole resistivity image log interpretation to identify geological surfaces in the subterranean formation (104) or performing simulation, planning, and optimization of production operations of the wellsite system (204). In one or more embodiments, the result generated by the E&P computer system (208) may be displayed for user viewing using a two dimensional (2D) display, three dimensional (3D) display, or other suitable displays. Although the surface unit (202) is shown as separate from the E&P computer system (208) in FIG. 1.1, in other examples, the surface unit (202) and the E&P computer system (208) may also be combined.

Figure 12:
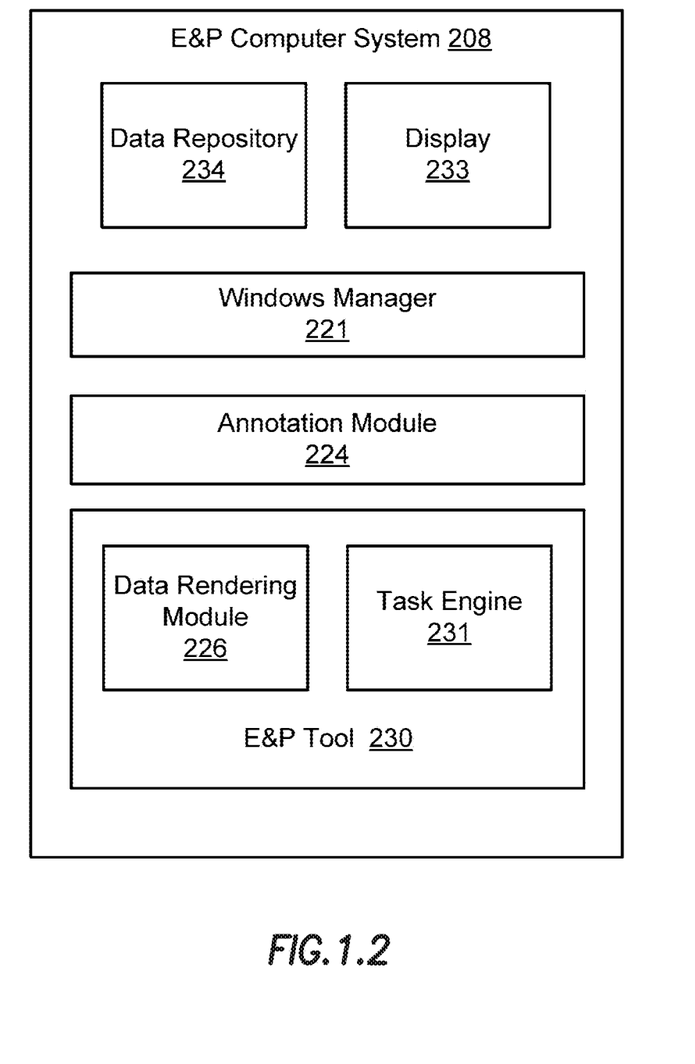

FIG. 1.2 shows more details of the E&P computer system (208) in which one or more embodiments of information pinning for contextual & task status awareness may be implemented. In one or more embodiments, one or more of the modules and elements shown in FIG. 1.2 may be omitted, repeated, and/or substituted. Accordingly, embodiments of information pinning for contextual & task status awareness should not be considered limited to the specific arrangements of modules shown in FIG. 1.2.

As shown in FIG. 1.2, the E&P computer system (208) includes E&P tool (230) having task engine (231) and data rendering module (226), annotation module (224), windows manager (221), data repository (234), and display (233). Each of these elements is described below.

In one or more embodiments, the E&P computer system (208) includes the E&P tool (230) having software instructions stored in a memory and executing on a processor to communicate with the surface unit (202) for receiving data therefrom and to manage (e.g., analyze, model, control, optimize, or perform other management tasks) the aforementioned field operations based on the received data. In one or more embodiments, the received data is stored in the data repository (234) to be processed by the E&P tool (230). One or more field operation management tasks (e.g., analysis task, modeling task, control task, optimization task, etc.) may be performed in an execution pass of the E&P tool (230), referred to as an E&P tool session. During the E&P tool session, the received data is manipulated by the task engine (231) to generate, continuously or intermittently, preliminary results that are rendered and displayed to the user using the data rendering module (226) and the display (233), respectively. For example, the E&P tool session may be a seismic interpretation session where the task engine (231) processes the seismic data set and the data rendering module (226) renders interpreted seismic results to be displayed to the user using the display (233). In one or more embodiments, the display (233) may be a 2D display, a 3D display, or other suitable display device that is configured to display E&P tool sessions. The processor and memory of the E&P computer system (208) are not explicitly depicted in FIG. 1.2 so as not to obscure other elements of the E&P computer system (208). An example of such processor and memory is described in reference to FIG. 4 below.

The data repository (234) (and/or any of the information stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. In various embodiments, the data repository (234) may be a device internal to the E&P computer system (208) and/or an external storage device operatively connected to the E&P computer system (208).

In one or more embodiments, the E&P computer system (208) includes an annotation module (224) configured to receive an annotation input from a first user. Specifically, the annotation input is received while the first user is performing a task using one (referred to as the current application window) of a number of windows that are created during at least a first one of a number of E&P tool sessions. In one or more embodiments, the task is performed based on a subterranean formation field data set described in reference to FIG. 1.1 above.

In response to the annotation input, the annotation module (224) is configured to generate a pinned annotation that is pinned to the current application window. In one or more embodiments, the pinned annotation contains information related to the first user, the task, and/or the current application window.

In one or more embodiments, the windows manager (221) is configured to manage the number of windows during each of the E&P tool sessions. Specifically, the windows manager (221) reconfigures any of the windows based on user requests, such as window opening, window closing, window expanding, window reducing, window maximizing, window minimizing, and other window manipulation requests. Further, the windows manager (221) may close a windows when the E&P tool session closes.

In one or more embodiments, the windows manager (221) is configured to add the pinned annotation to a windows list by at least storing an identifier of the pinned annotation with a reference to the one of the current application window. In one or more embodiments, the windows list includes references to the number of windows.

As noted above, the pinned annotation persists through reconfiguration of windows. For example, subsequent to adding the pinned annotation and in response to a first request from the first user, the windows manager (221) may close, minimize, or reduce the current application window. The closed, minimized, or reduced window remains tracked by the windows list but may no longer be active and therefore is no longer referred to as the current application window. In response to a second request subsequent to the first request, the windows manager (221) may open, maximize, or expand the closed, minimized, or reduced window. The opened, maximized, or expanded window will be superimposed by the pinned annotation. In one or more embodiments, the pinned annotation is identified based on the windows list to superimpose on the now opened, maximized, or expanded window. In one or more embodiments, the subterranean formation field data set, the pinned annotation, and the windows list are stored in the data repository (234).

Figure 2:
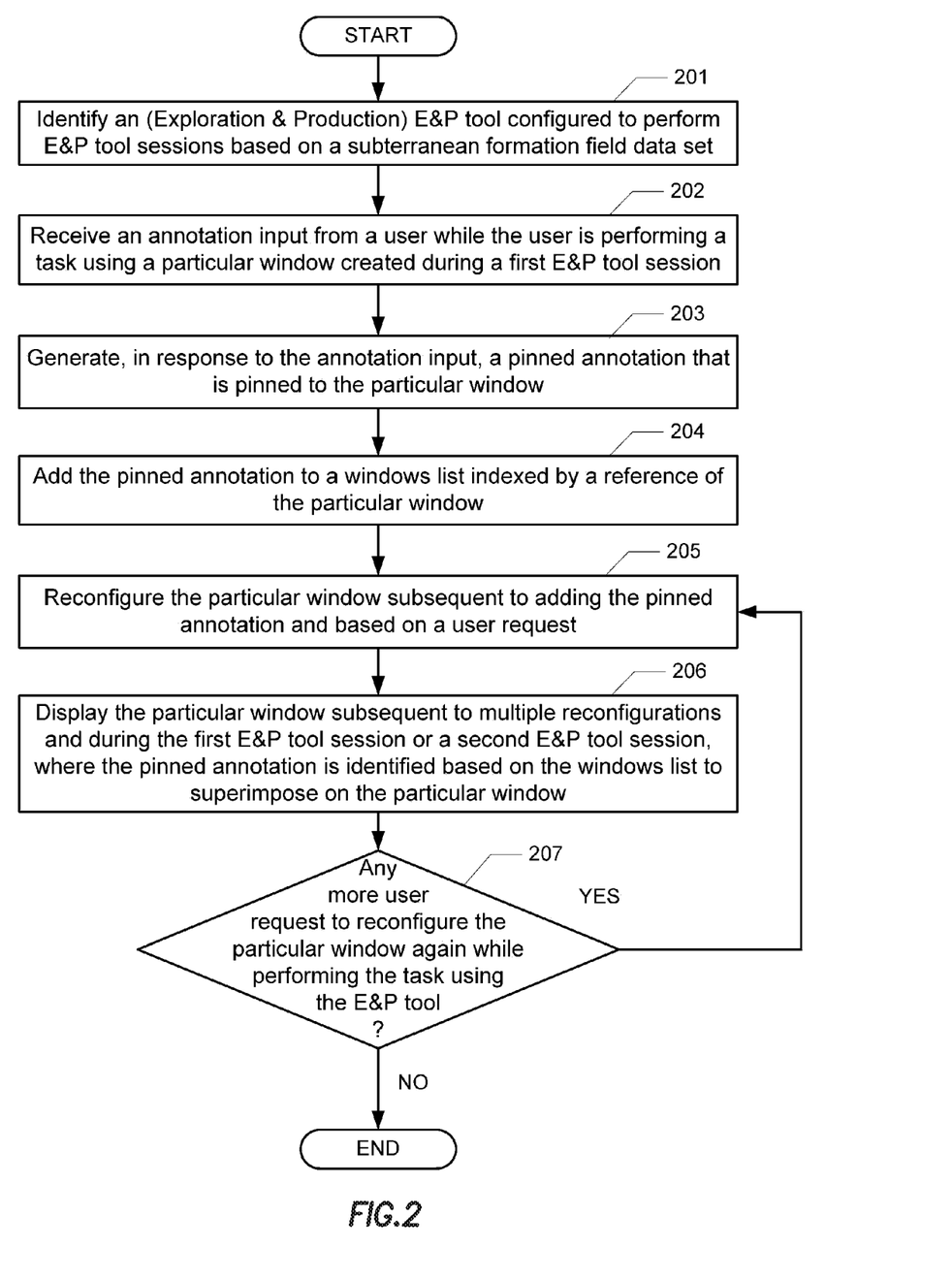
FIG. 2 shows a flow chart of a method for information pinning for contextual & task status awareness in accordance with one or more embodiments.

FIG. 2 shows a flow chart of a method for information pinning for contextual & task status awareness in accordance with one or more embodiments. In one or more embodiments, the method of FIG. 2 may be practiced using the exploration and production (E&P) computer system described in reference to FIG. 1.1 above. In one or more embodiments, one or more of the elements shown in FIG. 2 may be omitted, repeated, and/or performed in a different order than that shown in FIG. 2. Accordingly, the specific arrangement of elements shown in FIG. 2 should not be construed as limiting the scope of the disclosure.

Generally, the flow chart shown in FIG. 2 describes a method for contacting people associated with historic information during an E&P tool sessions of a field having a subterranean formation.

In Element 201, an E&P tool is identified. In one or more embodiments, one or more field operation management tasks (e.g., analysis task, modeling task, control task, optimization task, etc.) are performed in an execution pass of the E&P tool, referred to as an E&P tool session. In one or more embodiments, the field operation management tasks are performed using the E&P tool based on a subterranean formation field data set of the field. For example, the E&P tool session may be a seismic interpretation session where a seismic data set is processed to generate interpreted seismic results for displaying to a user. In this context, the field operation management task is an analysis task performed on the seismic data set.

In Element 202, an annotation input is received from the user while the user is performing a task (e.g., a field operation management tasks) using one or more windows (referred to as the current application window) that are created during the E&P tool session. For example, the window may include a user login window, a data import window, a task selection window, a result display window, etc. In one or more embodiments, the annotation input relates to information regarding the user, the field operation management task, and/or the current application window. For example, the annotation input may describe one or more of what's the status of the user's work, things that need to be addressed by the user's colleagues, changes that have been made by the user, points of attention for reminding the user him/herself or other users, etc. From the point of view when such information is later accessed again, the information contained in the annotation input may be referred to as historic information.

In Element 203, in response to the annotation input, a pinned annotation is generated by assigning the information contained in the annotation input to the current application window. In one or more embodiments, the assigning of such annotation information is referred to as pinning the annotation (referred to as the pinned annotation) to the current application window. In one or more embodiments, the pinned annotation is used to facilitate the task performed based on the subterranean formation field data set. As noted above, the historic information contained in the pinned annotation may be used by the user as a reminder, or by a different user as a reference.

In Element 204, the pinned annotation is added to a windows list for maintaining persistence of the pinned annotation through reconfiguration(s) of the particular window where the annotation is pinned. In one or more embodiments, the windows list is accessed to retrieve the pinned annotation to facilitate the task performed based on the subterranean formation field data set.

In one or more embodiments, based on user requests, any of the windows created during the E&P tool session may be reconfigured, such as window opening, window closing, window expanding, window reducing, window maximizing, window minimizing, and other window manipulation. In particular, windows created during the E&P tool session may be closed when the E&P tool session closes. Further, when a subsequent E&P tool session is opened, by the same user of the previously closed E&P tool session or by another user, one or more of the windows previously closed with the previous E&P tool session may be opened again. For example, the subsequent E&P tool session may reopen the user login window, the data import window, the task selection window, the result display window that are closed when the previous E&P tool session closes.

In one more embodiments, each of these windows is assigned a reference for identification. For example, the reference may be the name of the window (e.g., user login window) or some other computer readable representation associated with the name of the window. In one more embodiments, the pinned annotation is added to the windows list by at least storing an identifier of the pinned annotation with the reference to the particular window where the annotation is pinned. In one or more embodiments, an identifier of the pinned annotation is stored in the windows list as indexed by the reference of the particular window. Generally, the windows list may include one or more pinned annotation identifiers indexed by corresponding windows references.

In Element 205, in response to a request from the user subsequent to adding the pinned annotation, the particular window where the annotation is pinned is reconfigured. For example, the particular window may be expanded, reduced, maximized, minimized, closed, etc. by the user during the course of the user performing the field operation management task using the E&P tool.

In Element 206, after being reconfigured at least once during one or more E&P tool sessions, the particular window where the annotation is pinned is displayed. For example, the particular window may be displayed during the same E&P tool session where the annotation input was received, or during a subsequent E&P tool session. In one or more embodiments, the display of the particular window is superimposed by the pinned annotation. In one or more embodiments, the pinned annotation is identified using the windows list based on the reference of the particular window. Accordingly, the information contained in the pinned annotation may be viewed in association with the particular window. For example, information regarding the user, the field operation management task, and/or the particular window that were provided by the user previously as the annotation input may be viewed by the same user as a reminder, or by a different user as a reference. As a result, the field operation management tasks may be performed more effectively by the user(s) with the benefit of having access to such historic information annotated and pinned to the particular window.

In Element 207, a determination is made as to whether any more subsequent user window reconfiguration request is received while performing the field operation management task using the E&P tool. Specifically, the subsequent user window reconfiguration request may be submitted to further reconfigured the particular window where the annotation is pinned. If the determination is no, the method remains in Element 207 until the field operation management task is completed and the method will then end. If the determination is yes, the method returns to Element 205. In one or more embodiments, the particular window where the annotation is pinned is opened, expanded, reduced, maximized, minimized, closed, etc. for at least the second time by the user during the E&P tool session. In one or more embodiments, the particular window where the annotation is pinned is opened, expanded, reduced, maximized, minimized, closed, etc. in a subsequent E&P tool session after the user has completed the field operation management task and closed windows associated with the previous E&P tool session. For example, the subsequent E&P tool session may be initiated by the same user of the previous E&P tool session or by a different user. In other words, the subsequent user window reconfiguration request may be from the same user of the previous E&P tool session or from a different user.

Figure 31:
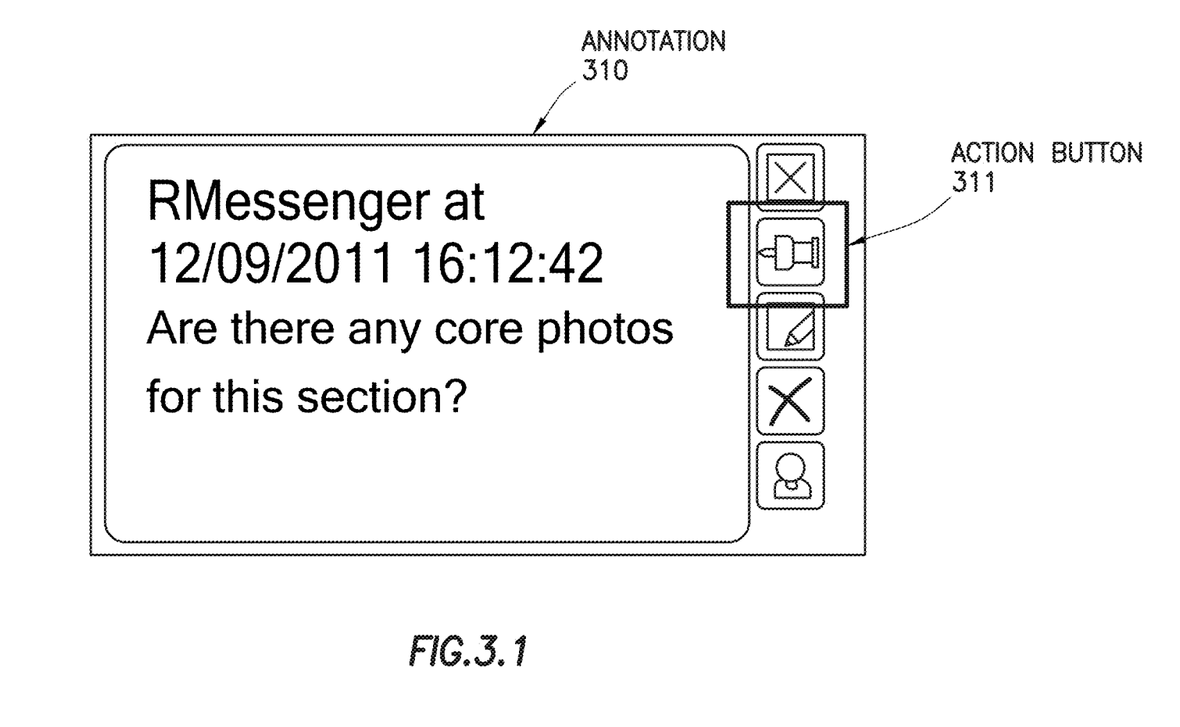
Figure 32:
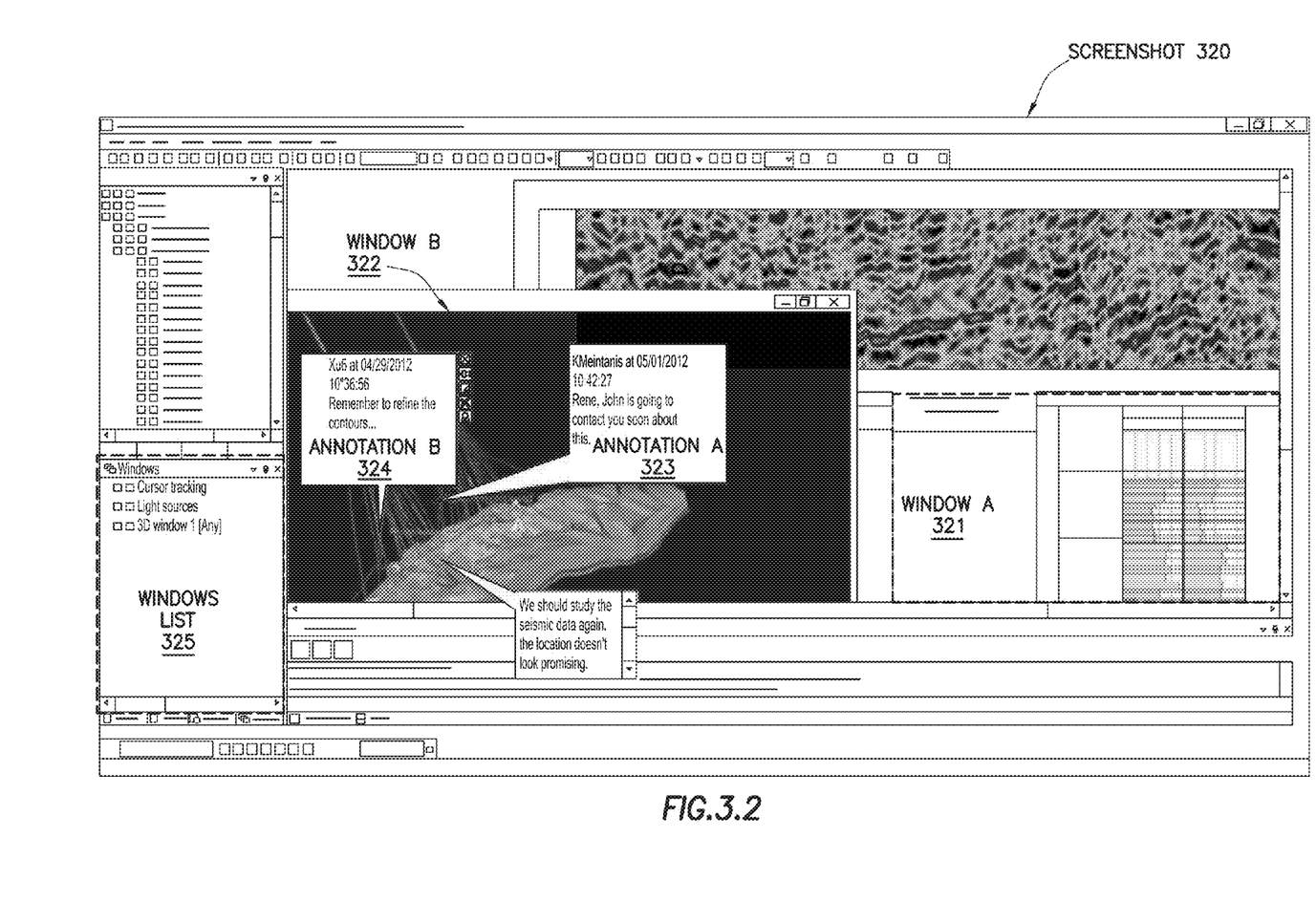

FIGS. 3.1 and 3.2 depict various screenshots that further illustrate the information pinning for contextual & task status awareness in accordance with one or more embodiments. In one of more embodiments, the example depicted in FIGS. 3.1 and 3.2 are practiced using the E&P computer system (208) described above.

FIG. 3.1 shows an annotation (310) that can be pinned to stay open on the current application window. Specifically, a user can click the action button (311) to pin the annotation (310).

FIG. 3.2 shows a screenshot (320) of a multi-window application with pinned annotations providing awareness on current status and next action items. As shown, the screenshot (320) includes a windows list (325) for tracking at least one window associated with oilfield objects related to the multi-window application. Each of the windows listed in the windows list (325) may be added, deleted, expanded, reduced, maximized, minimized, or otherwise manipulated by one or more users of the multi-window application. The content of the windows list (325) may persist over multiple sessions of the multi-window application that are initiated and terminated by any of one or more users of the multi-window application. For example, multiple users may collaborate on a joint project using the multi-window application.

As shown, window A (321) and window B (322) are both open for the multi-window application. In particular, the window B (322) is the current application window (i.e., the active window) as it is shown on top of other open window(s). Further, the annotation A (323) and the annotation B (324) have been pinned to the window B (322).

For example, the annotation A (323) may be created and pinned by a previous user who used the multi-window application before completing his/her part of the tasks and closed the multi-window application. Said in other words, this previous user pinned the annotation A (323) so that subsequent users may view his/her message/status contained in the annotation A (323) regarding an oilfield object that is associated with the window B (322).

In another example, the annotation B (324) may be created and pinned by a remote user who is collaborating with a local user. The remote user and the local user are concurrently using the multi-window application to complete remaining tasks left behind by the previous user who pinned the annotation A (323). In this example, the local user viewing the screenshot (320) can see both the annotation A (323) pinned by the previous user and the annotation B (324) pinned by the remote user. In a variation of this example, the local user is the same as the previous user.

In both examples described above, the annotations may include textual and/or graphical information and remain pinned regardless of one or more users modifying other content within the window, switching to other windows (of the same or a different application), or even closing the application without losing the pinned information when they return.

Figure 4:
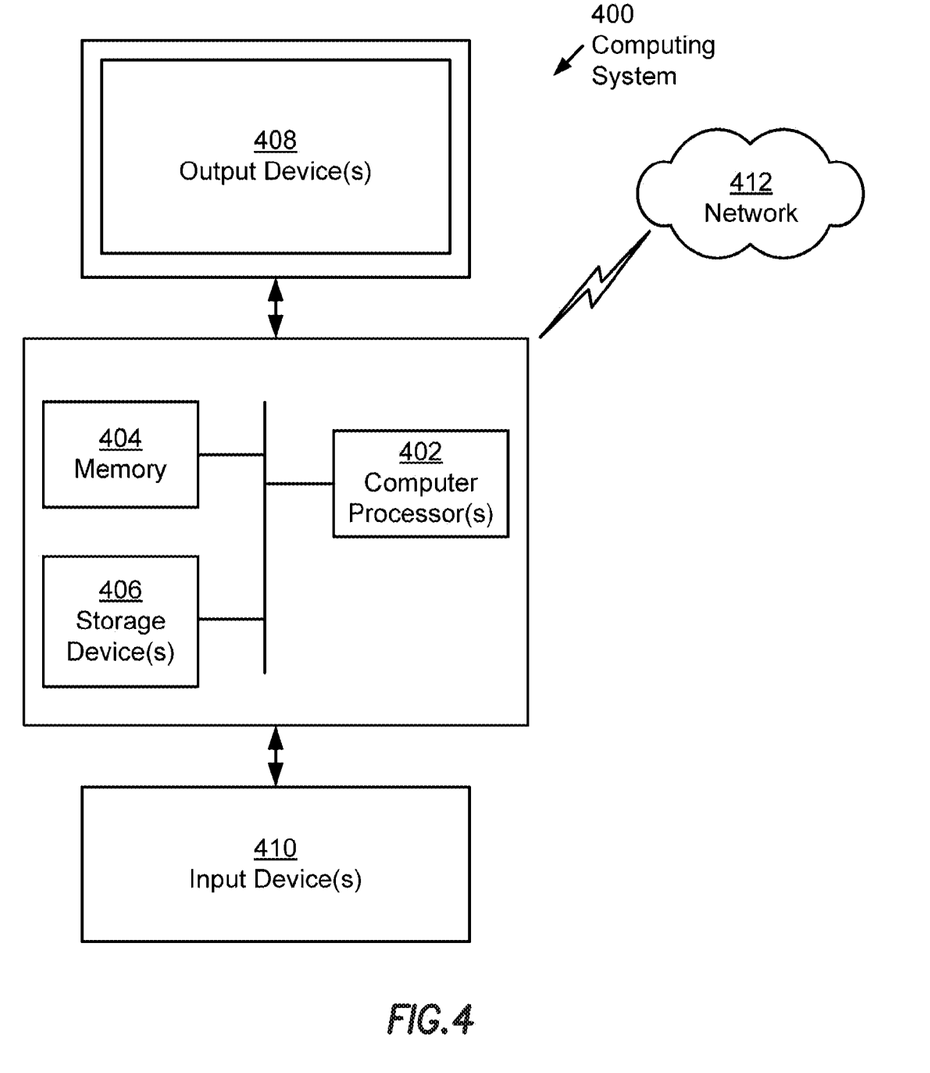
FIG. 4 depicts a computer system using which one or more embodiments of information pinning for contextual & task status awareness may be implemented.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform a process, method, or other set of steps consistent with embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (400) may be located at a remote location and connected to the other elements over a network (412). Further, embodiments may be implemented on a distributed system having a plurality of nodes, where each portion of the embodiments may be located on a different node within the distributed system. In various embodiments, the node corresponds to a distinct computing device and/or node a computer processor with associated physical memory. The node may also correspond to a computer processor or micro-core of a computer processor with shared memory and/or resources.

While embodiments has been described with respect to a limited number of embodiments, those skilled in the art, having benefit of this disclosure, will appreciate that other embodiments can be devised which do not depart from the scope of the disclosure herein. As such, although the preceding description has been described herein with reference to particular means, materials, and embodiments, it is not intended to be limited to the particulars disclosed herein. Rather, it extends to all functionally equivalent structures, methods, and uses, such as are within the scope of the appended claims.

What is claimed is:

1. A method for performing exploration and production (E&P) tool sessions of a field having a subterranean formation, comprising:

identifying an E&P tool configured to perform a plurality of E&P tool sessions based on a subterranean formation field data set;

receiving a first annotation input from a first user while the first user is performing a first portion of a task using one of a plurality of windows that are created during at least a first E&P tool session of the plurality of E&P tool sessions, wherein at least the first portion of the task is performed based on the subterranean formation field data set;

generating, by a computer processor and in response to the first annotation input, a first pinned annotation that is pinned to the one of the plurality of windows, wherein the first pinned annotation relates to a second portion of the task;

generating, in response to a second annotation input from a second user, a second pinned annotation that is pinned to the one of the plurality of windows, wherein the second pinned annotation relates to an alert for a local user and a remote user to collaborate with each other;

opening, during a second E&P tool session of the plurality of E&P tool sessions, the one of the plurality of windows that is superimposed by the first pinned annotation and the second pinned annotation, wherein the second E&P tool session is used by the local user to perform the second portion of the task based at least on the first pinned annotation and the second pinned annotation; and generating, in response to a remote annotation input from the remote user, a remote pinned annotation that is pinned to the one of the plurality of windows, wherein the remote user uses the remote pinned annotation to collaborate with the local user, wherein the first pinned annotation, the second pinned annotation, and the remote pinned annotation are simultaneously viewed by the local user in the one of the plurality of windows.

2. The method of claim 1,
wherein the remote pinned annotation comprises information related to at least one selected from a group consisting of the first user, the task, and the one of the plurality of windows.

3. The method of claim 1,
wherein the plurality of windows comprises a user login window, a data import window, a task selection window, and a result display window.

4. The method of claim 1, further comprising:
adding the first pinned annotation to a windows list by at least storing an identifier of the first pinned annotation with a reference to the one of the plurality of windows, wherein the windows list comprises a plurality of references to the plurality of windows; and
accessing the windows list for using the first pinned annotation to facilitate performing the task based on the subterranean formation field data set.

5. The method of claim 4, further comprising:
reconfiguring, subsequent to adding the first pinned annotation and in response to a first request from the first user, the one of the plurality of windows; and
displaying, subsequent to the first request and superimposed by the first pinned annotation, the one of the plurality of windows,
wherein the first pinned annotation is identified based on the windows list to superimpose on the one of the plurality of windows.

6. The method of claim 5, further comprising:
further reconfiguring, in response to a second request subsequent to the first request, the one of the plurality of windows; and
displaying, subsequent to the second request and superimposed by at least the first pinned annotation, the one of the plurality of windows during the second E&P tool session,
wherein the first pinned annotation is further identified based on the windows list during the second E&P tool session to superimpose on the one of the plurality of windows.

7. The method of claim 6,
wherein the second request is from at least one selected from a group consisting of the first user or a second user.

8. A computer system for performing exploration and production (E&P) tool sessions of a field having a subterranean formation, comprising:
a processor and memory;
an E&P tool stored in the memory, executing on the processor, and configured to perform a plurality of E&P tool sessions based on a subterranean formation field data set;
an annotation module stored in the memory, executing on the processor, and configured to:
receive a first annotation input from a first user while the first user is performing a first portion of a task using one of a plurality of windows that are created during at least a first E&P tool session of the plurality of E&P tool sessions, wherein at least the first portion of the task is performed based on the subterranean formation field data set;
generate, in response to the first annotation input, a first pinned annotation that is pinned to the one of the plurality of windows, wherein the first pinned annotation relates to a second portion of the task;
generate, in response to a second annotation input from a second user, a second pinned annotation that is pinned to the one of the plurality of windows, wherein the second pinned annotation relates to an alert for a local user and a remote user to collaborate with each other; and
generate, in response to a remote annotation input from the remote user, a remote pinned annotation that is pinned to the one of the plurality of windows, wherein the remote user uses the remote pinned annotation to collaborate with the local user;
a windows manager stored in the memory, executing on the processor, and configured to:
open, during a second E&P tool session of the plurality of E&P tool sessions, the one of the plurality of windows that is superimposed by the first pinned annotation and the second pinned annotation, wherein the second E&P tool session is used by the local user to perform the second portion of the task based at least on the first pinned annotation and the second pinned annotation,
wherein the first pinned annotation, the second pinned annotation, and the remote pinned annotation are simultaneously viewed by the local user in the one of the plurality of windows; and
a repository configured to store the subterranean formation field data set and the first pinned annotation, the second pinned annotation, and the remote pinned annotation.

9. The system of claim 8,
wherein the remote pinned annotation comprises information related to at least one selected from a group consisting of the first user, the task, and the one of the plurality of windows.

10. The system of claim 8,
wherein the plurality of windows comprises a user login window, a data import window, a task selection window, and a result display window.

11. The system of claim 8,
the windows manager further configured to:
add the first pinned annotation to a windows list by at least storing an identifier of the first pinned annotation with a reference to the one of the plurality of windows, wherein the windows list comprises a plurality of references to the plurality of windows; and access the windows list for using the first pinned annotation to facilitate performing the task based on the subterranean formation field data set, wherein the repository is further configured to store the windows list.

12. The system of claim 11, further comprising:

a display configured to display the plurality of E&P tool sessions, wherein the windows manager is further configured to:
reconfigure the one of the plurality of windows in response to a first request from the first user subsequent to adding the first pinned annotation, wherein the one of the plurality of windows is displayed subsequent to the first request and superimposed by the first pinned annotation, and wherein the first pinned annotation is identified based on the windows list to superimpose on the one of the plurality of windows.

13. The system of claim 12, wherein the windows manager is further configured to:
further reconfigure, in response to the second request subsequent to the first request, the one of the plurality of windows, wherein the display is further configured to display, subsequent to the second request and superimposed by at least the first pinned annotation, the one of the plurality of windows during the second E&P tool session, and wherein the first pinned annotation is further identified based on the windows list during the second E&P tool session to superimpose on the one of the plurality of windows.

14. The system of claim 13, wherein the second request is from at least one selected from a group consisting of the first user or a second user.

15. A non-transitory computer readable storage medium comprising software instructions for performing exploration and production (E&P) tool sessions of a field having a subterranean formation, that when executed, comprise functionality for:

identifying an E&P tool configured to perform a plurality of E&P tool sessions based on a subterranean formation field data set;

receiving a first annotation input from a first user while the first user is performing a first portion of a task using one of a plurality of windows that are created during at least a first E&P tool session of the plurality of E&P tool sessions, wherein at least the first portion of the task is performed based on the subterranean formation field data set;

generating, by a computer processor and in response to the first annotation input, a first pinned annotation that is pinned to the one of the plurality of windows, wherein the first pinned annotation relates to a second portion of the task;

generating, in response to a second annotation input from a second user, a second pinned annotation that is pinned to the one of the plurality of windows, wherein the second pinned annotation relates to an alert for a local user and a remote user to collaborate with each other;

opening, during a second E&P tool session of the plurality of E&P tool sessions, the one of the plurality of windows that is superimposed by the first pinned annotation and the second pinned annotation, wherein the second E&P tool session is used by the local user to perform the second portion of the task based at least on the first pinned annotation and the second pinned annotation; and generating, in response to a remote annotation input from the remote user, a remote pinned annotation that is pinned to the one of the plurality of windows, wherein the remote user uses the remote pinned annotation to collaborate with the local user, wherein the first pinned annotation, the second pinned annotation, and the remote pinned annotation are simultaneously viewed by the local user in the one of the plurality of windows.

16. The non-transitory computer readable storage medium of claim 15, wherein the remote pinned annotation comprises information related to at least one selected from a group consisting of the first user, the task, and the one of the plurality of windows.

17. The non-transitory computer readable storage medium of claim 15, wherein the plurality of windows comprises a user login window, a data import window, a task selection window, and a result display window.

18. The non-transitory computer readable storage medium of claim 15, the software instructions when executed, further comprising functionality for:

adding the first pinned annotation to a windows list by at least storing an identifier of the first pinned annotation with a reference to the one of the plurality of windows, wherein the windows list comprises a plurality of references to the plurality of windows; and accessing the windows list for using the first pinned annotation to facilitate performing the task based on the subterranean formation field data set.

19. The non-transitory computer readable storage medium of claim 18, the software instructions when executed, further comprising functionality for:

reconfiguring, subsequent to adding the first pinned annotation and in response to a first request from the first user, the one of the plurality of windows; and displaying, subsequent to the first request and superimposed by the first pinned annotation, the one of the plurality of windows, wherein the first pinned annotation is identified based on the windows list to superimpose on the one of the plurality of windows.

20. The non-transitory computer readable storage medium of claim 19, the software instructions when executed, further comprising functionality for:

further reconfiguring, in response to a second request subsequent to the first request, the one of the plurality of windows; and displaying, subsequent to the second request and superimposed by at least the first pinned annotation, the one of the plurality of windows during the second E&P tool session, wherein the first pinned annotation is further identified based on the windows list during the second E&P tool session to superimpose on the one of the plurality of windows.

* * * * *